United States Patent
Charbit et al.

(10) Patent No.: US 10,396,947 B2
(45) Date of Patent: *Aug. 27, 2019

(54) POWER CONTROL FOR CARRIER AGGREGATION ON SHARED BANDS

(71) Applicant: AVAGO TECHNOLOGIES INTERNATIONAL SALES PTE. LIMITED

(72) Inventors: Gilles Charbit, Farnborough (GB); Tao Chen, Espoo (FI)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 244 days.

This patent is subject to a terminal disclaimer.

(21) Appl. No.: 15/042,251

(22) Filed: Feb. 12, 2016

(65) Prior Publication Data

US 2016/0164644 A1 Jun. 9, 2016

Related U.S. Application Data

(63) Continuation of application No. 14/747,935, filed on Jun. 23, 2015, now Pat. No. 9,326,254, which is a (Continued)

(30) Foreign Application Priority Data

Feb. 2, 2012 (GB) .................................. 1201791.9

(51) Int. Cl.
*H04W 74/08* (2009.01)
*H04L 27/00* (2006.01)
(Continued)

(52) U.S. Cl.
CPC ............ *H04L 5/001* (2013.01); *H04L 5/0032* (2013.01); *H04W 52/04* (2013.01);
(Continued)

(58) Field of Classification Search
CPC ............................ H04W 52/04; H04W 52/243
(Continued)

(56) References Cited

U.S. PATENT DOCUMENTS

| 8,599,785 | B1 | 12/2013 | Dinan | |
|---|---|---|---|---|
| 2008/0170544 | A1* | 7/2008 | Tang | ................... H04W 74/006 370/329 |

(Continued)

FOREIGN PATENT DOCUMENTS

GB 2477649 A 8/2011

OTHER PUBLICATIONS

Wang, H. et al., Uplink Component Carrier Selection for LTE-Advanced Systems with Carrier Aggregation, 2011 IEEE International Conference on Communications (dated Jun. 5-9, 2011), 5 pages.

*Primary Examiner* — Asad M Nawaz
*Assistant Examiner* — Jason A Harley
(74) *Attorney, Agent, or Firm* — Xsensus LLP

(57) ABSTRACT

There is provided, for example, an apparatus, which is caused to select a transmission power configuration for a communication with at least one user terminal taking place on component carriers of a carrier aggregation configuration within a shared band, wherein the selection is between a low transmission power configuration applying a transmission power below a predetermined power threshold without a listen-before-talk approach and a high transmission power configuration applying a transmission power of at least the predetermined power threshold; and upon detecting that the selected transmission power configuration needs to be informed, cause an indication of the selected transmission power configuration to the at least one user terminal and at least one secondary cell.

18 Claims, 5 Drawing Sheets

Related U.S. Application Data continuation of application No. 13/757,499, filed on Feb. 1, 2013, now Pat. No. 9,094,917.

(51) Int. Cl.
    *H04W 74/00*      (2009.01)
    *H04W 72/04*      (2009.01)
    *H04L 5/00*      (2006.01)
    *H04W 52/04*      (2009.01)
    *H04W 52/34*      (2009.01)
    *H04W 52/24*      (2009.01)
    *H04W 72/08*      (2009.01)
    *H04W 52/36*      (2009.01)
    *H04W 84/04*      (2009.01)
    *H04W 84/12*      (2009.01)

(52) U.S. Cl.
    CPC ......... *H04W 52/243* (2013.01); *H04W 52/34* (2013.01); *H04W 72/082* (2013.01); *H04W 52/343* (2013.01); *H04W 52/367* (2013.01); *H04W 84/042* (2013.01); *H04W 84/12* (2013.01)

(58) Field of Classification Search
    USPC .................. 455/522, 69, 452.1; 370/329, 330
    See application file for complete search history.

(56) References Cited

U.S. PATENT DOCUMENTS

| | | | |
|---|---|---|---|
| 2009/0047984 A1* | 2/2009 | Gollamudi | H04W 72/048 455/513 |
| 2010/0208681 A1 | 8/2010 | Elmaleh | |
| 2011/0149894 A1* | 6/2011 | Luo | H04W 16/02 370/329 |
| 2011/0312366 A1 | 12/2011 | Yang et al. | |
| 2012/0170544 A1* | 7/2012 | Cheng | H04L 5/0098 370/329 |
| 2012/0176979 A1 | 7/2012 | Kim et al. | |
| 2012/0264468 A1* | 10/2012 | Turtinen | H04L 5/001 455/509 |
| 2013/0148591 A1 | 6/2013 | Lim et al. | |
| 2013/0258864 A1 | 10/2013 | Chen et al. | |
| 2014/0171144 A1 | 6/2014 | Kim et al. | |

\* cited by examiner

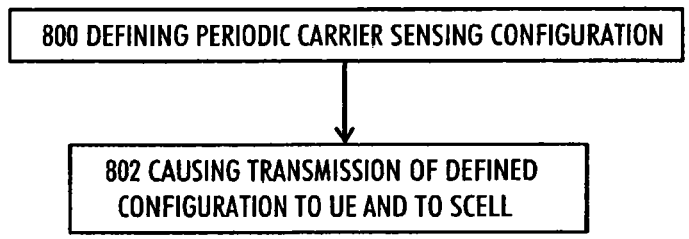
FIG. 8
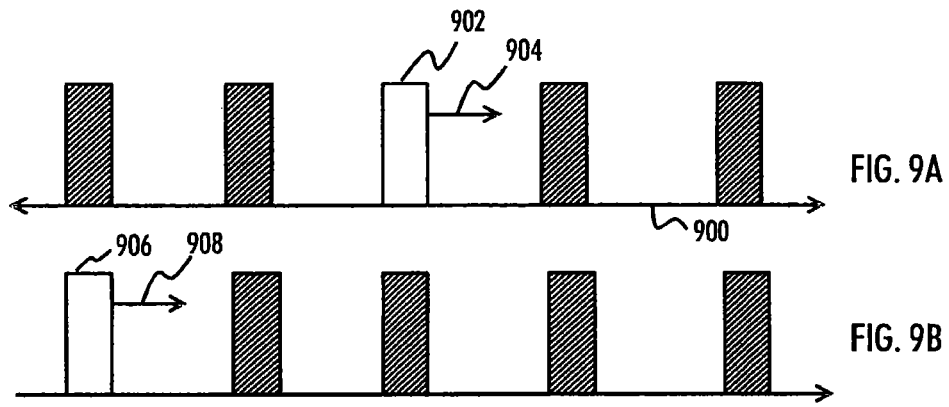
FIG. 9A
FIG. 9B
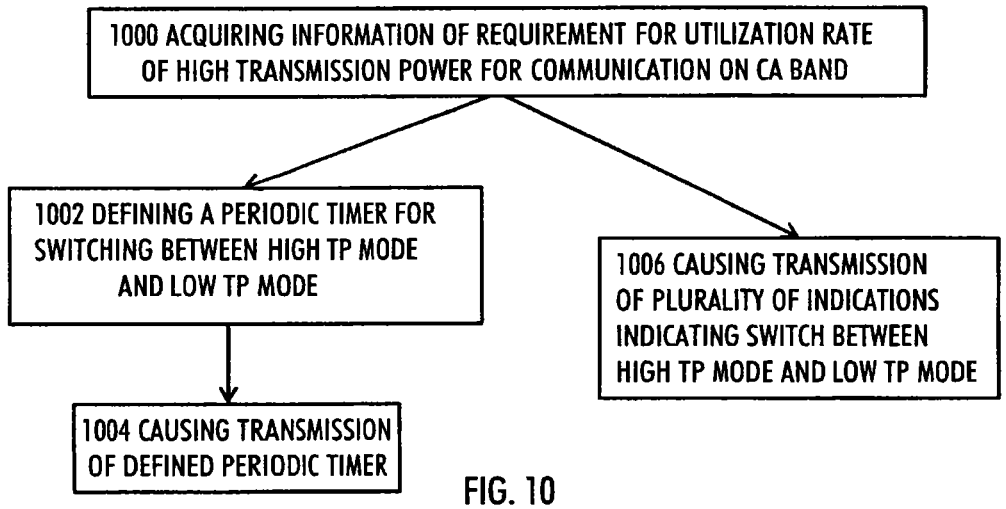
FIG. 10

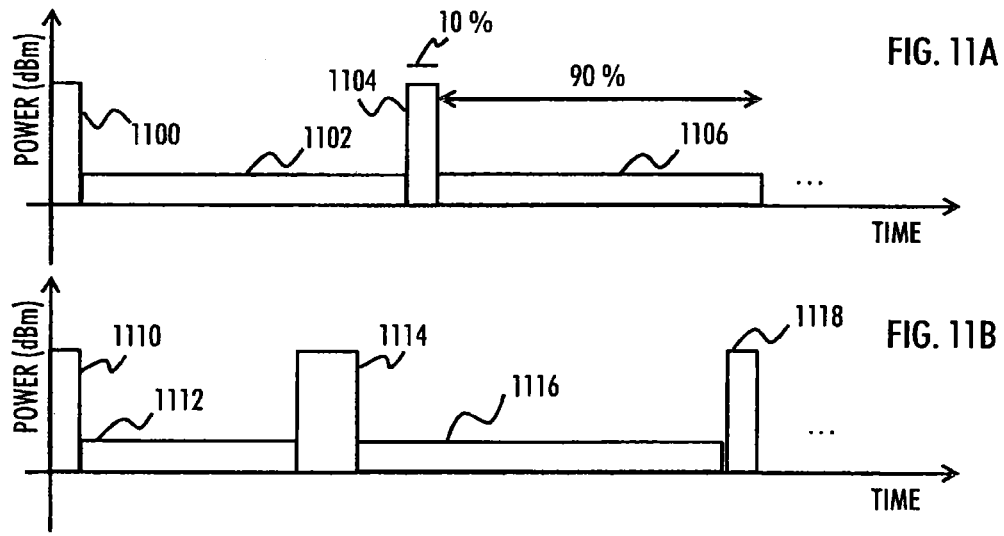
FIG. 11A
FIG. 11B
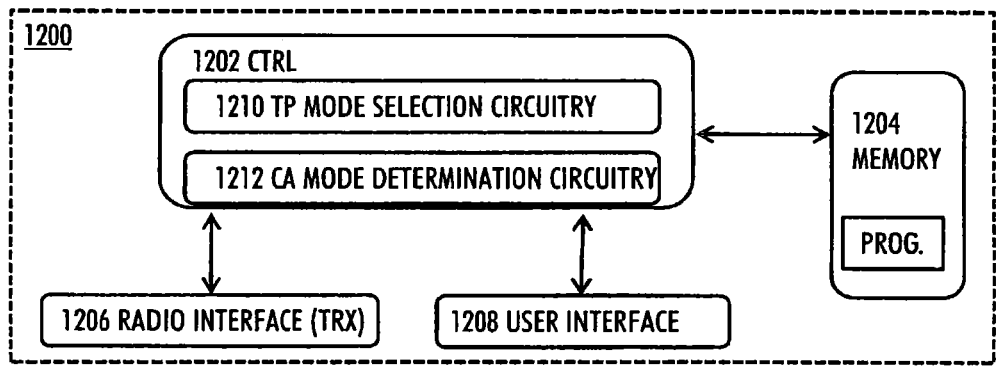
FIG. 12
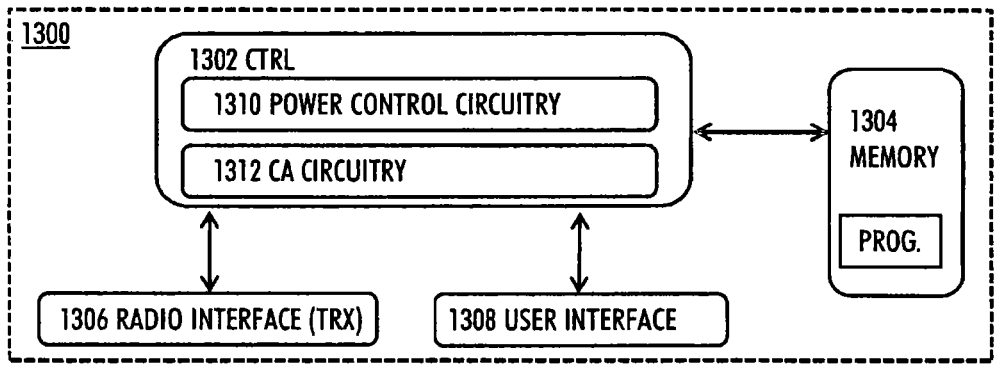
FIG. 13

United States Patent US 10,396,947 B2

POWER CONTROL FOR CARRIER AGGREGATION ON SHARED BANDS

CROSS-REFERENCE TO RELATED APPLICATIONS

This application is a continuation of and claims the benefit of priority to U.S. Ser. No. 14/747,935, filed Jun. 23, 2015, which is a continuation of U.S. Ser. No. 13/757,499, filed Feb. 1, 2013, now U.S. Pat. No. 9,094,917, which claims priority to and the benefit of United Kingdom application number 1201791.9, filed on Feb. 2, 2012; the contents of each of which are hereby incorporated by reference.

FIELD

The invention relates generally to mobile communication networks. More particularly, the invention relates to communication on component carriers of a carrier aggregation configuration on a shared band.

BACKGROUND

To achieve the high data rate requirement of the Long Term Evolution Advanced (LTE-A) of the 3.sup.rd Generation Partnership Project (3GPP), it may be beneficial to increase the transmission bandwidths over those that can be supported by a single carrier. Therefore, a carrier aggregation (CA) is proposed. By using the CA, it may be possible to utilize more than one carrier and in this way increase the overall transmission bandwidth. These channels or carriers may be contiguous elements of the spectrum, or they may be in different bands.

Moreover, an unlicensed band may be utilized along with or instead of a costly licensed spectrum. The unlicensed, license exempt or a license-free spectrum may also be called as a shared spectrum. Interesting shared band opportunities may comprise e.g. the industrial, scientific and medical (ISM) bands and TV white spaces.

However the use of the unlicensed bands may be cumbersome due to regulations and because interference to other systems utilizing the shared band must be controlled, for example. Thus, finding free carriers for the carrier aggregation from the scarcity of available interference free carriers on the shared band may be problematic. Therefore, a solution for improving the carrier aggregation communication efficiency on a shared band is needed, for example.

BRIEF DESCRIPTION OF THE INVENTION

Embodiments of the invention seek to improve the communication efficiency on a shared band when applying carrier aggregation.

According to an aspect of the invention, there is provided a method as specified in claim 1.

According to an aspect of the invention, there are provided apparatuses as specified in claims 6 and 14.

According to an aspect of the invention, there is provided a method, comprising: selecting, by a controller, a transmission power configuration for a communication with at least one user terminal taking place on component carriers of a carrier aggregation configuration within a shared band, wherein the selection is between a low transmission power configuration applying a transmission power below a predetermined power threshold without a listen-before-talk approach and a high transmission power configuration applying a transmission power of at least the predetermined power threshold; and upon detecting that the selected transmission power configuration needs to be informed, causing an indication of the selected transmission power configuration to the at least one user terminal and at least one secondary cell.

According to an aspect of the invention, there is provided a computer program product embodied on a distribution medium readable by a computer and comprising program instructions which, when loaded into an apparatus, execute the method according to any of the appended claims.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents an example communication network where the embodiments of the invention are applicable to;

Figure 5A:
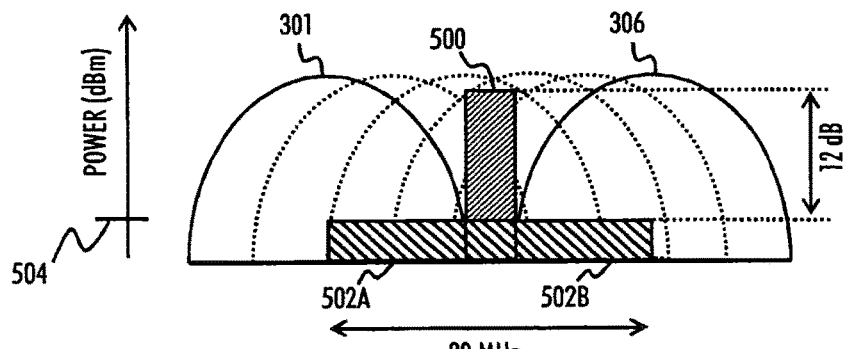
Figure 5B:
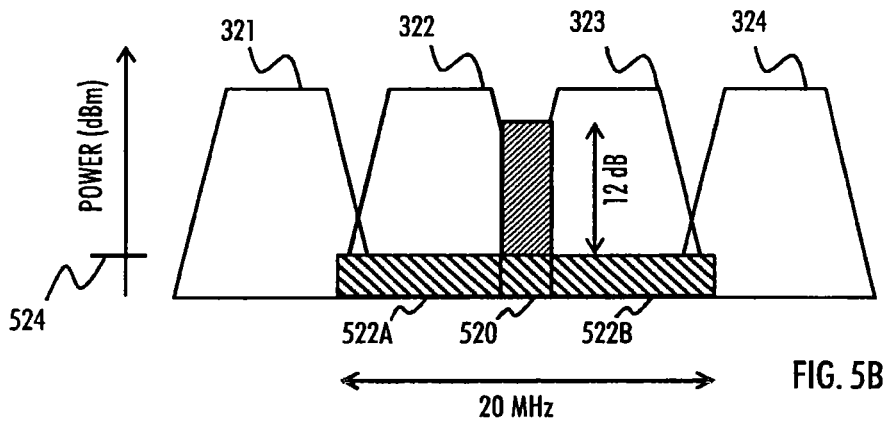
Figure 6:
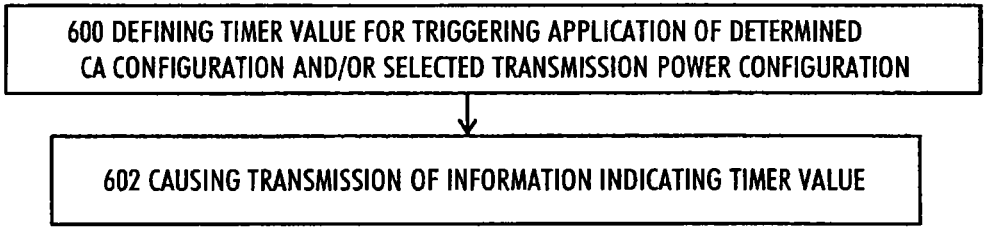
Figure 7:
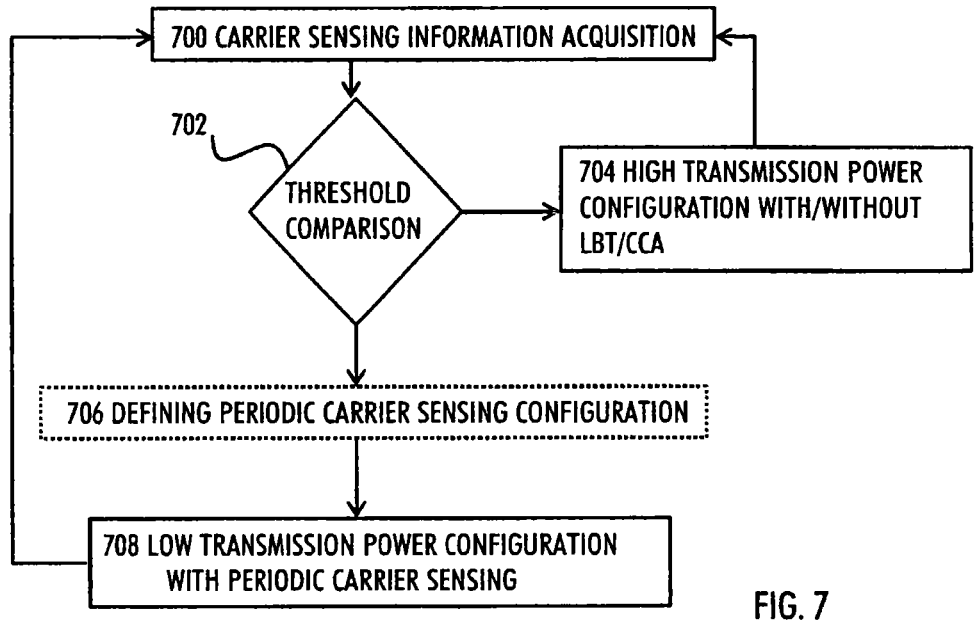

FIGS. 5A and 5B present example mapping based on CA configuration, according to an embodiment;

FIGS. 6, 7, and 8 present methods according to some embodiments;

FIGS. 9A and 9B illustrate some examples for a detection of free and "dirty" carriers;

FIG. 10 presents a method according to an embodiment;

FIGS. 11A and 11B show how a utilization ratio for a high transmission power is reached, according to some embodiments; and FIGS. 12 and 13 illustrate apparatuses according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
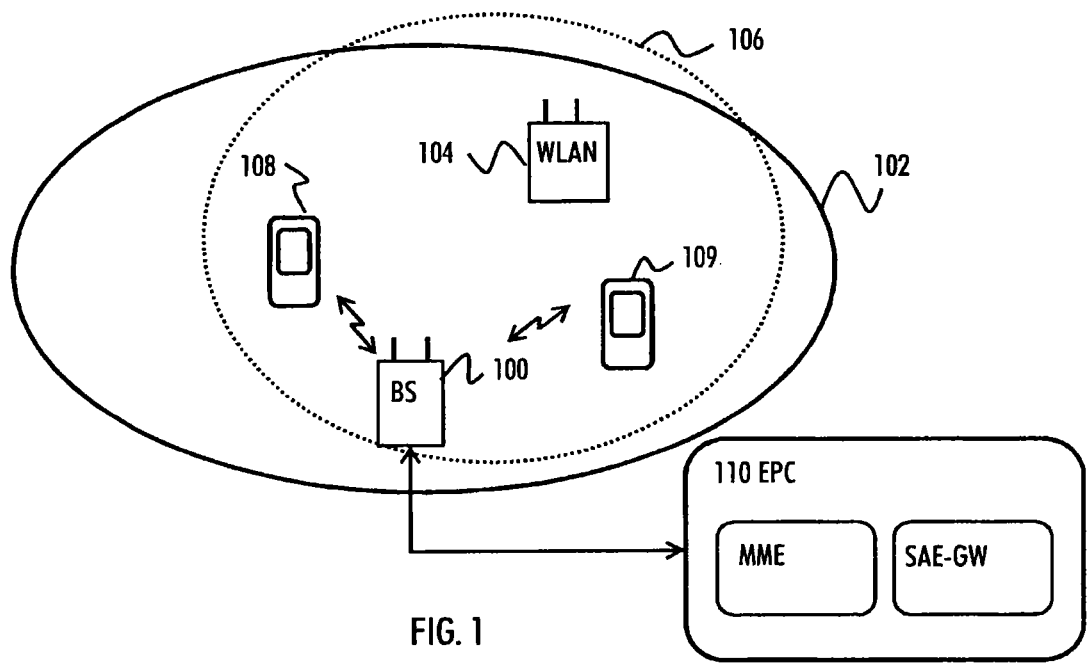

FIG. 1 shows an example communication network where the some embodiments of the invention are applicable to. The communication network of FIG. 1 may comprise a base station 100 providing radio coverage to a cell 102 shown with solid circle and handling radio resource allocation for the cell 102. In general, the base station 100 applicable to the embodiments may be configured to provide communication services according to at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

The base station may be an evolved node B (eNB) as in the LTE-A, a radio network controller (RNC) as in the UMTS, a base station controller (BSC) as in the GSM/GERAN, or any other apparatus capable of controlling radio communication and managing radio resources within the cell. For the sake of simplicity, let us assume that the base station 100 is an eNB. In the case of multiple eNBs in the communication network, the eNBs may be connected to each other with an X2 interface as specified in the LTE. The eNB 100 may be further connected via an Si interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, a connection to Internet.

In the example of FIG. 1, user equipment (UE) 108 and 109 are camped on the eNB 100. Furthermore, a wireless local area network (WLAN) base station 104 may be transmitting with a coverage area 106 shown with a dotted circle. The term user equipment (UE) refers to a portable computing device. Such computing devices include wireless mobile communication devices operating with or without a subscriber identification module (SIM), including, but not limited to, the following types of terminal devices: mobile phone, user terminal (UT), smartphone, personal digital assistant (PDA), handset, laptop computer.

In an embodiment, at least some of the above connections between eNB 100 and UEs 108 and 109 utilise an unlicensed or shared spectrum which may be the same as the spectrum used by the WLAN base station 104 or by some other apparatus utilizing ISM spectrum. Thus, it may be that multiple systems may be allocated to share a common frequency band or spectrum which is shared in a dynamic manner between different systems. There may be a primary user system which has a priority access to the shared spectrum. For example, the WLAN users may be seen as the primary users whereas the cellular users may be so called secondary users. The secondary user may not be allowed to impose severe interference to the primary users. Alternatively, no system is given priority to the spectrum usage.

As said, carrier aggregation may be of use when reaching the higher data rate requirements. It has been proposed that a primary cell carrier (PCC) using LTE technology is configured on the licensed band for a primary access providing for example mobility, security and state management for user terminals/equipment (UT/UE), while a secondary cell carrier (SCC) using the WLAN technology is opportunistically configured/activated on the unlicensed ISM band for a secondary access to provide for example additional data plane transport. The ISM band may be occupied by other systems, such as the WLAN (also known as the WiFi). Therefore, it may be of importance that interference between the systems is avoided or at least minimized.

Figure 2:
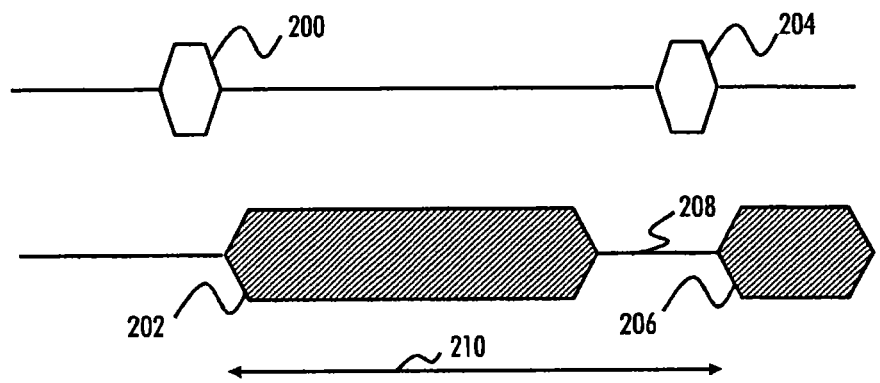
FIG. 2 shows an example of a listen-before-talk procedure.

To avoid the interference, e.g. to avoid communication on an already occupied carrier, a listen-before-talk (LBT) approach may be used as shown in FIG. 2. This means that before transmission, the device performs a clear channel assessment (CCA) check, as shown with blocks 200 or 204, using, for example, energy detect. The device may observe the operating channel for the duration of the CCA observation time (such as for 20 has) and consider channel to be occupied if the energy level in the channel exceeds the energy detection threshold. However, when channel is clear (e.g. detected energy below a threshold) the device may start to transmit, as shown with blocks 202 and 206 having right leaning diagonal lines. As is clear from FIG. 2, no communication takes place for example during the idle period 208. In other words, out of the fixed frame period 210, no communication takes place during a large portion of frame period 210. Thus, the efficiency of the communication may not be optimal.

Figure 3A:
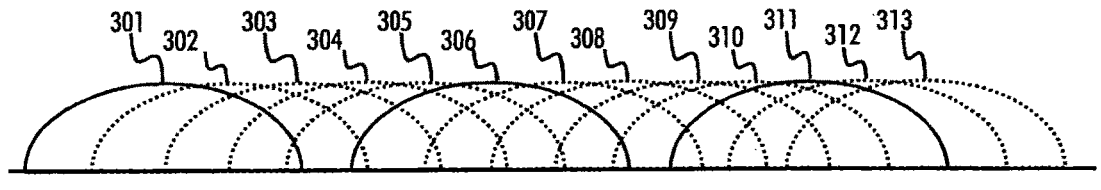
FIGS. 3A and 3B show WLAN/WiFi channelization examples.
Figure 3B:
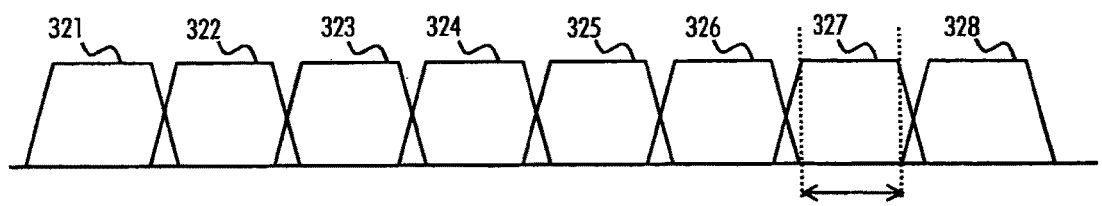

As an alternative to only the SCC applying the WiFi/WLAN technology, standalone utilization is considered where the whole LTE system is operating on the unlicensed band, such as on the ISM band. Further, the LTE system may use an intra-band carrier aggregation mechanism, where the aggregated carriers are in the same band. Regarding the WLAN/WiFi channelization on the ISM band, which depends at some level on the geographical location, let us assume that there are up to three non-overlapping WiFi signals possible on the ISM 2.4 GHz band, as shown in FIG. 3A with reference numerals 301, 306 and 311. The other channels/carriers among the plurality of channels/carriers 301 to 313 are overlapping with at least one other carrier in this example embodiment. The above assumes a direct sequence (DS) physical layer (PHY) signal spread over 22 MHz as in the IEEE 802.11b standard. Alternatively, when considering the 5 GHz ISM band with reference to FIG. 3B, let us assume that there are up to eight non-overlapping channels/carriers 321 to 328 assuming orthogonal frequency division multiplexing (OFDM) PHY signal, which is effectively occupying 16.25 MHz per OFDM signal according to the IEEE 802.11a standards. It is to be noted, that in order to enable the carrier aggregation, at least two relatively interference-free carriers are needed, which may be difficult to find on the ISM band.

In order to further optimize the communication, it is proposed that frame based requirements with regards to the LBT approach do not apply for a transmission device provided that the device limits its max output power to predetermined threshold, such as to 10 dBm, instead of the 20 dBm/23 dBm max output power specified in the ISM 2.4 GHz/5 GHz unlicensed bands, respectively. Also the device may need to limit its transmission power to 10 dBm/MHz with respect to the power spectral density. This may denote that before transmission, the equipment does not need to perform the CCA/LBT. This may facilitate the deployment of the LTE on the unlicensed bands, as the LTE transmitter may transmit without a need for sensing of WiFi transmissions.

Figure 4:
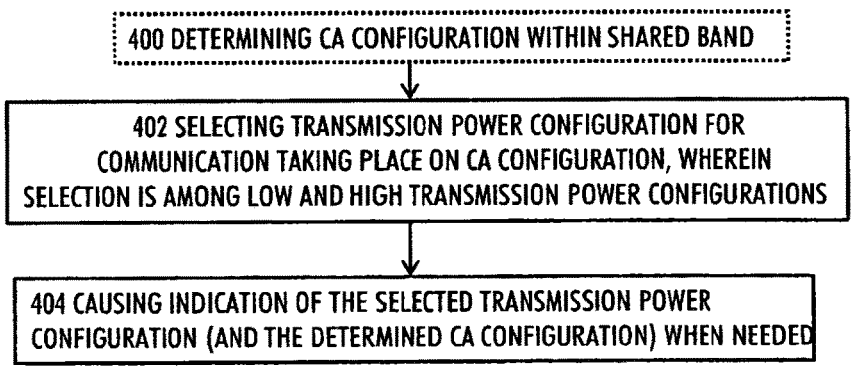
FIG. 4 illustrates a method according to an example embodiment.

Therefore, it is proposed that a base station of a primary cell (Pcell), such as the eNB 100, selects in step 402 of FIG. 4, a transmission power (TP) configuration/mode for a communication with at least one user terminal (UT/UE) taking place on component carriers (CC) of a carrier aggregation (CA) configuration within a shared band. Thus, the CCs of the CA configuration are on the shared, unlicensed spectrum which may be used by other systems in addition to the LTE system. Details of the CA configuration are given later. Regarding the selection of the TP configuration, the selection is between a low transmission power configuration applying a transmission power below a predetermined power threshold without a listen-before-talk approach and a high transmission power configuration applying a transmission power of at least the predetermined power threshold.

In an embodiment, the predetermined power threshold limits a total transmission power to 10 dBm and to 10 dBm per one MHz bandwidth at maximum, over the bandwidth of the aggregated carriers. In an embodiment, the predetermined power threshold limits the total transmission power to about 10 dBm and to about 10 dBm per one MHz bandwidth at maximum, over the bandwidth of the aggregated carriers. The values may be given as equivalent isotropically radiated power (EIRP) values. For example, assuming a bandwidth of 20 MHz (WiFi operating channel), these transmission power limitations allow the transmitting device to decide how the available 10 dBm total output power is divided inside the 20 MHz bandwidth. When a uniform power spectral density is applied, the transmitting device may allocate 1 dBm in a 2 MHz band (=0.5 dBm in a 1 MHz band). When no such uniform power spectral density is applied, the transmitting device may allocate all the 10 dBm transmission power in a single 1 MHz band if it chooses to do that. In other words, when the TP configuration is the low TP configuration, the transmission power of the transmitting device over the aggregated bandwidth of the CCs is limited so that, as said earlier, the device may transmit without performing the CCA/LBT procedure, i.e. without sensing of, for example, WiFi interference on the shared band. This may ensure that the transmitting device is able to transmit data even during high traffic load.

However, high TP configuration may be beneficial in some circumstances, such as when important control data needs to be conveyed to another communication party. Therefore, the selected TP configuration may also be the high TP configuration where the transmission power is at least (equals to or is above) the predetermined power threshold over the aggregated bandwidth of the CA configuration. As such, the transmission power of the transmitting device, such as the eNB 100 or the UE 108/109, may be, for example, 10-20 dBm or 10-23 dBm. The strong transmit power may aid the transmitted signal to reach the target device. For example, coverage of the transmitted signal may be extended compared to the low TP configuration.

In an embodiment, the selection between the high TP configuration and the low TP configuration is performed randomly in the beginning. For example, let us assume that the CA configuration/mode is also being set up by the eNB 100. The eNB 100 thus may need to decide the TP configuration for the set-up CA mode. In such case, where no information is available for which the selection could be based on, the eNB 100 may select the to-be-used TP configuration randomly. Later, the selected TP configuration may be switched to another, as will be explained with further embodiments.

In an embodiment, the low TP configuration is selected in the beginning so as to ensure that data may be transmitted on the shared band. As illustrated above with FIG. 2, when the LBT procedure is used, the transmitting device may have problems in finding free channel for transmitting the information. As the low TP configuration does not apply the LBT procedure and uses, for example, less than 10 dBm transmit power, the transmitting device is more frequently, or even always, allowed to access the channel and transmit the data. Later, the selected low TP configuration may be switched to another.

In another embodiment, the high TP configuration may be selected in the beginning to allow higher transmit power. This may be advantageous in that more UEs may be reached due to a larger coverage area, for example. Later, the selected high TP configuration may be switched to another.

However, it may be that there is already an on-going communication with the at least one UT 108, 109 applying the CA mode. In this case, the eNB 100 may select the TP mode based on certain information available to the eNB 100, as will be described later.

Further, the eNB 100 may in step 404 of the FIG. 4, cause an indication of the selected TP configuration to the at least one UE 108, 109 and at least one secondary cell (Scell) upon detecting that the selected TP configuration needs to be informed to other communication parties. For example, when there is already an on-going communication applying the CA mode and the eNB 100 obtains information based on which the eNB 100 decides to keep (e.g. select) a TP configuration currently used in the on-going communication, the eNB 100 may not need to transmit any indications to the other communication parties. However, if the selected TP configuration requires a change to the current TP configuration, the eNB 100 may decide to cause the transmission of the indication. This may allow for example low control channel overhead in the data channel. After the indication, the Scell and the UEs 108, 109 may employ the indicated TP mode in communication on the CA band.

The eNB 100 may, for example, use dedicated signaling to each UE 108, 109 when transmitting the information to each of the UEs 108, 109 or to only a subset of the UEs 108, 109. Therefore, the eNB 100 may indicate to the UEs 108, 109 an uplink (UL) max transmission power to be used in the closed-loop UL power control procedure on the aggregated bandwidth of the CCs so as to limit the UE's total output transmission power to, for example, 10 dBm maximum and to 10 dBm/MHz maximum. As the UL power control signaling may be indicated via the dedicated signalling, there may be no need to modify the current downlink control information (DCI) format on the physical downlink control channel (PDCCH) used for the UL power control. Similarly dedicated signaling may be used for indicating the new downlink (DL) power control configuration on the aggregated bandwidth to the at least one Scell. The dedicated signaling may take place on a primary component carrier of the carrier aggregation configuration, for example. In another embodiment, the UEs 108, 109 and/or the at least one Scell (e.g. WLAN access point AP 104) may receive the information via a multicast or broadcast message from the eNB 100.

FIG. 4 further depicts a step 400 with dotted lines. The step 400 defines that the eNB 100 may, in an embodiment, also determine the CA configuration comprising a primary component carrier corresponding to the Pcell and at least one secondary component carrier corresponding to the at least one Scell. As said, the component carriers of the CA configuration are within the shared band applicable to a plurality of communication systems. However, the CA configuration step 400 may be omitted in case the CA configuration has already earlier been set up by the eNB 100 or by some other network entity.

In case the eNB 100 does determine the CA configuration in step 400, the eNB 100 may also cause an indication of the determined CA configuration to the at least one user terminal 108, 109 and to the at least one Scell. Therefore, the switching of LTE operations on Pcell to aggregated carriers on Pcell and Scell may be done via a dedicated signaling, for example. In an embodiment this indication may accompany the indication of the TP configuration performed in step 404. Thus, the newly selected TP configuration may be included in this message about the determined CA configuration, or vice versa. In another embodiment, this indication is a separate indication. In an embodiment, the eNB 100 transmitting the TP configuration simultaneously allows the UEs 108, 109 and the Scell to detect that a predetermined CA configuration is to be applied in the communication with the eNB 100. In yet another embodiment, the eNB 100 transmitting the CA configuration simultaneously allows the UEs 108, 109 and the Scell to detect that a predetermined TP configuration, such as the low TP configuration or the high TP configuration, is to be applied in the communication with the eNB 100 on the aggregated band.

Regarding the CA configuration, in an embodiment, the Pcell is on the primary component carrier (PCC) with a bandwidth Bpcc, and the Scell in on the secondary component carrier (SCC) on a carrier segment with a bandwidth Bscc. This results in an aggregated bandwidth of Bpcc+Bscc. The carrier segment is seen as a part of the aggregated carriers and, for example, no separate activation/deactivation is needed for the carrier segment. In practice WiFi interference on the unlicensed band is not likely to vary rapidly (e.g. switching of new WiFi Access Points or new WiFi stations coming on) and only a relatively small number of UEs are likely to be connected to the local LTE CA system on the unlicensed band. The PCC may be used for carrying the essential signaling, such as a new system information block (SIB) message to indicate the data carrier configuration, such as the bandwidth and the central frequency, data carrier indicator to allocate the data carrier for UE monitoring, Physical Broadcast Channel (PBCH), Physical Control Format Indicator Channel (PCFICH), Physical Downlink Control Channel (PDCCH), Physical HARQ Indicator Channel (PHICH), primary synchronization signal (PSS), secondary synchronization signal (SSS), paging, and Physical Uplink Control Channel (PUCCH), for example. However, the PCC is also suitable for communication of user data instead of or along with the control data.

The operating bandwidth of the PCC may vary. When using a narrow bandwidth for the PCC with a minimum requirement of 1.08 MHz, e.g., the PCC may be mapped/deployed on the unlicensed band between two in-used WIFI carriers, e.g. to a gap between two non-overlapping signals on the shared band. However, when a wider bandwidth is allowed, more user data may be conveyed on the PCC as well.

The SCC in the combined carrier may be used to carry, for example, the PDCCH and physical downlink shared channel (PDSCH) for the data transmission in the downlink and the PUCCH and physical uplink shared channel (PUSCH) for the data transmission in the uplink. The at least one SCC may comprise carrier segments adjacent to the PCC and is mapped/deployed within the two non-overlapping signals, such as WiFi signals, on the shared band. The segments may be either semi-statically or statically configured. A change in the CA configuration, e.g. a change in the configuration of carrier segments, may cause a CA bandwidth change on the fly.

The operating bandwidth including the PCC and SCC may be configured with different system bandwidths. In an embodiment, the operation bandwidth of the CA configuration is adjusted by the size and number of the at least one SCC. Thus, the eNB 100 may change the operation bandwidth by (re)determining the CA configuration with respect to the number and/or size of the SCC. The variation in the operation bandwidth may allow the max output power of 10 dBm to be used over relatively smaller bandwidth. This is beneficial for example when it is needed to improve a signal-to-interference-plus-noise ratio (SINR) at the receiving party. For example, all UEs applying the CA configuration may be configured with a system bandwidth of 10 MHz corresponding to 50 physical resource block (PRBs) instead of 20 MHz (=100 PRBs), which gives 3 dB SINR gain. Further, with a 1.4 MHz (=6 PRBs) system bandwidth, instead of 20 MHz, the gain may be approximately 10*log(100/6)=12.

FIGS. 5A and 5B show an example mapping of the PCC and the at least one SCC for the 2.4 GHz ISM band and for the 5 GHz ISM band, respectively. FIG. 5A shows an example mapping of PCC 500 and SCC 502A, 502B in the ISM 2.4 GHz band assuming a DS PHY, as in the IEEE 802.11b standards. Since the PCC 500 is mapped to a gap in the frequency domain between two non-overlapping WiFi DS PHY signals 301, 306, the interference from WiFi is at minimum. The SCC 502A, 502B on the carrier segments may be mapped within the non-overlapping WiFi DS PHY signals 301, 306. Hence, the receiver may experience relatively more WiFi interference at their respective receivers. The overall bandwidth Bpcc+Bscc may be 20 MHz, for example. The block having the right leaning diagonal lines shows an example of the PCC 500 with high transmit power, whereas the block with left leaning diagonal lines illustrates CA configuration with the low TP mode applying at maximum a predetermined power threshold 504.

In FIG. 5B the same is shown for the 5 GHz ISM band. The PCC 520 is between the two non-overlapping signals 322 and 323 on the shared band, whereas the SCC segments 522A, 522B are within the signal 322, 323 bandwidths. Again, the block having the right leaning diagonal lines shows an example of PCC 520 with high transmit power, whereas the block with left leaning diagonal lines illustrated CA configuration with the low TP mode applying at maximum a predetermined power threshold 524.

With respect to both FIGS. 5A and 5B, based on UE 108, 109 WiFi measurement report(s), the eNB 100 may decide that no significant WiFi interference is experienced at UE's 108, 109 receiver. This may be due to the UE 108, 109 being relatively far from the WiFi interference source, such as a WiFi Access Point or a WiFi station. Consequently, the eNB 100 may configure the system bandwidth on aggregated carriers accordingly, as shown with the blocks having left leaning diagonal lines. The Bscc may be adjusted and be in the range 1.4 MHz (6 PRBs) to 20 MHz (100 PRBs). To conform to the max output power of, let's say, 10 dBm, the indication of the TP configuration (such as a DLPowerControlAggregatedCarriers-config may indicate a 10*log(100/6)=12 dB lower transmission power over an aggregated bandwidth Bpcc+Bscc, which may be 20 MHz (100 PRBs) as shown in FIGS. 5A and 5B, compared to a transmission power over a non-aggregated Bpcc, which may be 1.4 MHz (6 PRBs). Non-aggregated means that there is no Bscc and, hence the full 10 dBm transmission power may be used over a narrower system bandwidth as indicated by the blocks with right leaning diagonal lines.

In an embodiment as shown in FIG. 6, the eNB 100 determines in step 600 a timer value which defines when to apply at least one of the following: the determined carrier aggregation configuration and the selected transmission power configuration. Thus, in an embodiment, the timer value defines when the attached UEs 108 and 109 may activate the SCC on the carrier segment prescribed in the CA configuration. In another embodiment, the timer value defines when to start applying the selected TP configuration. For example, if the current TP mode applies the high transmission power and eNB 100 determines that the low TP mode is to be applied, the eNB 100 may define the timer value so that all communication parties or a subset of all communication parties perform the change from the high TP mode to the low TP mode substantially simultaneously. In yet another embodiment, the timer defines a time to trigger both, the determined CA configuration and the selected TP configuration, on.

The eNB 100 may then in step 602 cause a transmission of an indication of the timer value to the at least one UT 108, 109 and the at least one Scell. A common timer value, such as a commonly known system frame number (SFN) value may be beneficial in order to allow the LTE system to switch to the low transmission power aggregated bandwidth operation mode substantially simultaneously. Thus, the timer value may be configured via a dedicated signaling to the UEs 108, 109 and to the Scell in order to allow them to activate the SCC at the same time. The proposed way may allow a DL power control with a possible bandwidth change on the fly.

Let us now look at how a switch between the different TP configurations may be accomplished with respect to FIGS. 7 to 9. An orthogonal frequency division multiplexing (OFDM) modulation is assumed. There may be three different TP configurations distinguished: Adaptive mode with the power in the range of 10-20 dBm and the usage of the LBT/CCA procedure, Non-adaptive mode with the power in the range of 10-20 dBm and the requirement of less than a predetermined resource utilization ratio for the high transmission power, and Low TP mode (less than 10 dBm) without any constraint on sensing for CCA/LBT or the utilization ratio.

The transmission power range (10-20 dBm) should be seen as a non-limiting example. The third mode is the low TP configuration without CCA/LBT procedure. The first one (the adaptive mode) corresponds to the high TP mode applying the LBT/CCA procedure which is illustrated in FIG. 2. The second mode in the list, i.e. the non-adaptive mode, on the other hand, does not apply the high transmission power in all transmissions but only for a certain period of time or only for a certain amount of resources. Thus, it is kind of a hybrid transmission mode which applies both of the low TP mode and the high TP mode in turns.

FIG. 7 illustrates a how information from the at least one UE 108, 109 may be used in the decision on whether or not to switch the TP configuration. In step 700 the eNB 100 acquires carrier sensing information from at least one UT 108, 109 applying the aggregated carrier configuration. Such information may also be received from the Scell. However, for the sake of simplicity, let us assume that a user terminal transmits the data to the eNB 100. The carrier sensing information acquisition may be done in order to enable (re)selection of the TP configuration based on the acquired carrier sensing information. The carrier sensing information may be related to at least one of the following: a traffic load on any of the applied component carriers and interference on any of the applied component carriers.

When the UE 108, 109 is currently applying the high TP configuration, the UE 108, 109 performs carrier sensing based on the LBT procedure. The carrier sensing information obtained in the LBT procedure may be transmitted to the eNB 100 in step 700, for example.

However, when the current TP configuration is the low TP configuration, the UE 108, 109 does not perform the LBT/CCA procedure. In this case, it may be advantageous, as shown in FIG. 8, that the eNB 100, upon selecting the low TP configuration, defines in step 800 a periodic carrier sensing to take place by the UE during the low TP power configuration. The eNB 100 may then transmit in step 802 an indication to the at least one user terminal to perform the periodic carrier sensing in order to enable the acquisition of the carrier sensing information by the eNB 100 in step 700. In other words, even though low TP configuration does not require the UE 108, 109 to perform any carrier sensing, the UE 108, 109 may make channel assessment with a configured period to check the possibility of switching back to high TP mode. The periodic carrier sensing configuration may be signalled by the eNB 100 via a dedicated signaling or a broadcast message. Therefore, regardless of the current TP mode, the eNB 100 is able to receive carrier sensing information from the UEs 108, 109 and/or from the Scell, in case the Scell is configured to sense the carrier. The Scell may be configured to sense the channel in the same manners as the UEs 108, 109 are configured to do so.

The eNB 100 may derive a parameter from the carrier sensing information obtained. Such parameter may be the amount of traffic, amount of interference, an interference detection ratio, a number of "dirty" channel detections within a predetermined time period, a number of adjacent "dirty" channel detections, for example. Then in step 702, the eNB 100 may determine whether or not the derived parameter exceeds a predetermined threshold.

In an embodiment as shown in FIGS. 9A and 9B, the carrier sensing information indicates at least one of the following: the number of detections indicating an occupied channel during a predetermined time window 900 in FIG. 9A, and the number of adjacent detections indicating an occupied channel. In the Figures, a detection of an occupied channel in marked with a block having right leaning diagonal lines, whereas a detection of a free channel is marked with white blocks 902 and 906. After detecting a fee channel/carrier, the transmitting device is free to send for a certain period of time, as shown with arrows 904 and 908. Looking at FIG. 9A, it may be seen that there are four "dirty" channel detections. This information may be used to derive an interference detection ratio as a ratio of "dirty" detections over the all attempts of channel assessment during the predefined sliding time window 900. In another example shown in FIG. 9B, the number of consecutive "dirty" channel detections may be obtained. In the example of FIG. 9B, the number of adjacent "dirty" detections is four. Either of these parameters may be used as the criteria to switch between the low TP mode and the high TP mode in step 702.

As an example, in case of low load and/or low interference (e.g. the acquired carrier sensing information indicates traffic load and/or the interference not exceeding predetermined load and/or interference thresholds in step 702), CCA based high TP mode may be efficient. As a consequence, the method of FIG. 7 may proceed to step 704 where the high TP mode with LBT/CCA procedure is kept or triggered on. In particular, upon detecting that the selected TP configuration requires a change of the current TP configuration, the eNB 100 may transmit an indication of the selected high TP configuration to the at least one user terminal and the at least one secondary cell.

In case the acquired carrier sensing information indicates the traffic load not exceeding the predetermined load threshold and the interference exceeding the predetermined interference threshold, the eNB 100 may select the high transmission power configuration without the listen-before-talk approach. As a consequence, the method of FIG. 7 may proceed to step 704 where the high TP mode without LBT/CCA procedure is kept or triggered on. Thereafter, the selected TP mode may be indicated to the other communication parties if needed. However, although not shown in the Figure, the periodic carrier/channel sensing may take place also with this high TP mode without the LBT/CCA in order to acquire carrier sensing information. For the setting of such periodic carrier sensing, the procedure as shown in FIG. 8 may be applied.

In all other comparison case, the low transmission power mode may be selected. For example, in case of high load and/or strong interference, (e.g. the acquired carrier sensing information indicates traffic load and/or the interference exceeding the predetermined load and/or interference thresholds in step 702), the low TP mode with less than 10 dBm power may be applied. Then the transmitting device does not perform the LBT procedure and is able to transmit data with low transmit power even if the channel is occupied. Accordingly, the method of FIG. 7 may proceed to step 706 for defining the periodic carrier sensing configuration for the low TP mode, as depicted in FIG. 8. However the step 706 may be omitted if the communicating parties are aware of a predetermined carrier sensing configuration that is to be applied during the low TP configuration. Thereafter, the method may proceed to step 708 where the low TP mode is either kept or triggered on. The eNB 100 may apply dedicated signaling or broadcasting in conveying the selected TP mode to the UEs 108, 109 and to the Scell, if needed.

Therefore, the switching may depend on a predetermined threshold for the load and/or the interference. The predetermined threshold may be obtained via empirical experiments, for example. In an embodiment, the predetermined load threshold may be 10%, e.g. the channel is occupied 10% of the time. As said, the acquired carrier sensing information may also be used to derive the interference detection ratio during the LBT/CCA procedure. The interference detection ratio may be used to reflect the access collision probability coupling with the load and the interference. For example, in case the interference detection ratio is higher than a predefined threshold, the device may enter to steps 706 and 708 in order to keep on trigger on the low TP operation mode. The device may still make channel assessment with a configured period to check the possibility of switching back CCA mode, as illustrated in FIG. 8. As a further option the predetermined threshold in the criteria and the measurement sliding window 900 may be configured and signalled to the UE 108, 109 via a dedicated signaling or a broadcast message. As the UE 108, 109 may obtain the knowledge of the switching criteria, the UE 108, 109 may itself decide whether or not to switch the current transmission power configuration.

Moreover, the mode switching criteria may be different depending on the current TP mode. For example, switching from the high TP mode to the low TP mode may depend on checking the interference detection ratio criteria, whereas switching from the low TP mode to the high TP mode with the LBT/CCA may depend on monitoring how consecutively the "dirty" channel detection happens. The mode switching may allow an optimum use of the wireless medium based on the power control due to efficient utilization of the fractional resources in the unlicensed band.

Let us next look at the hybrid mode, i.e. the non-adaptive high TP configuration. The eNB 100 may acquire, as shown in step 1000 of FIG. 10, knowledge of a requirement for utilization rate of the high transmission power in the communication taking place on the component carriers of the CA configuration. For example, for an OFDM based non-adaptive high TP mode, there may be a requirement for the Wireless Medium Utilization Factor (WMUF), which requires that the high transmission power is applied with less than 10% utilization ratio of the time/power resources, wherein the 10% is a non-limiting example. The eNB 100 may acquire the utilization ratio corresponding to a time period/resources from the network via a dedicated signaling, for example. During the 10% utilization period, the high transmission power without the CCA/LBT procedure may be applied. This high transmission power period may be used for the most essential control signaling and/or high priority data due to the better coverage and high quality, for example. During the 90% idle period, the low transmission power may be applied. The low transmission power period may be used for a lower priority data transmission. During the low TP periods, the periodic carrier sensing as indicated in FIG. 8 may be applied instead of the LBT procedure. In another example, for an OFDM based adaptive high TP mode, there may be a requirement for the Wireless Medium Utilization Factor (WMUF), which requires that the high transmission power is applied with more than 10% utilization ratio of the time/power resources. During the more than 10% utilization period, the high transmission power with the CCA/LBT procedure may be applied.

As illustrated in FIGS. 10 and 11, there are several approaches for the high TP and low TP mode switching to ensure less than 10% WMUF in the non-adaptive high TP mode operation. Although not detailed here, the same approaches may be used for the switching in the OFDM based adaptive high TP mode with the requirement for the WMUF, which requires that the high transmission power is applied with more than 10% utilization ratio of the time/power resources. It is to be noted that the 10% is a non-limiting example.

In an embodiment, the eNB 100 defines, in step 1002, a periodic timer for switching between the high TP configuration and the low TP configuration in order to fulfill the requirement for the utilization rate. Thereafter, the eNB 100 may cause a signaling of the timer to the at least one UT 108, 109 and the at least one Scell in step 1004. The operation according to the periodic timer for switching is shown in FIG. 11A. The period 1100 and 1104 are periodically triggered on for transmitting data with high power, whereas the periods 1102 and 1106 are reserved for transmitting data with low transmit power. Such a configuration ensures that the utilization rate requirement is obeyed with.

As another embodiment, step 1006 of FIG. 10 comprise causing transmission of a plurality of indications to the at least one user terminal 108, 109 and the at least one secondary cell, wherein each of the plurality of indications indicates a switch to the high TP configuration or to the low TP configuration depending on the current TP configuration, in order to fulfill the requirement for the utilization rate. Such embodiment is further illustrated in FIG. 11B where the high transmission periods 1110, 1114 and 1118 are dynamically switched on by an eNB signaling. During the rest of the time, e.g. during periods 1112 and 1116, the transmitting device is to apply low transmission power. Alternatively the periods for low transmission power 1112 and 1116 may be dynamically switched on by the eNB signaling. During the rest of the time, e.g. during periods 1110, 1114 and 1118, the transmitting device is to apply high transmission power. As can be seen, the periods may not be of the same duration. Although FIGS. 11A and 11B illustrate the time domain, the requirement for the utilization rate of the high transmit power may be similarly defined for the frequency domain, for example.

In an embodiment, a subset of the UEs 108, 109, such as one of the UEs 108, 109, in the cell are associated with the selected TP mode configuration. However, in an embodiment, all of the connected user terminals 108, 109 in the primary cell are associated with the selected TP configuration. In this case, the eNB 100 may indicate each UE in the primary cell to apply the CA configuration with the selected TP mode when communicating on the component carriers of the carrier aggregation configuration. Thus, the switch to the transmission power mode may be cell-specific, not UE-specific.

For example, there may be cell-edge UEs that may not be able to receive properly even the high power transmission. The eNB 100 may know this if DL packets are not acknowledged by the UEs or simply make use of a timing advance in a specified UL timing alignment procedure. When there are many cell-edge UEs unable to receive the packets, the eNB 100 may switch the transmission mode. Thus, a kind of fine tuning for the cell-edge UEs may be a part of eNB 100 functionalities. As the UEs are aware of the transmission power mode of the system based on signaling or the predefined timer value, the cell-edge UEs with power shortage may enter into idle mode during the low transmission power mode. This may not be harmful to the cell-edge UEs because they may not be able to operate properly even with the high TP mode. As such, the mode switching to the low TP mode may bring benefits for the cell-central UEs and may not be harmful for the cell-edge UEs.

An embodiment, as shown in FIG. 12, provides an apparatus 1200 comprising a control circuitry (CTRL) 1202, such as at least one processor, and at least one memory 1204 including a computer program code (PROG), wherein the at least one memory 1204 and the computer program code (PROG), are configured, with the at least one control circuitry 1202, to cause the apparatus 1200 to carry out any one of the above-described processes. It should be noted that FIG. 12 shows only the elements and functional entities required for understanding a processing system of the apparatus 1200. Other components have been omitted for reasons of simplicity. It is apparent to a person skilled in the art that the apparatus may also comprise other functions and structures.

In an embodiment, the apparatus 1200 may be or be comprised in a base station (also called a base transceiver station, a Node B, a radio network controller, or an evolved Node B, for example). In an embodiment the apparatus 1200 is or is comprised in the eNB 100 of the primary cell.

As said, the apparatus 1200 may comprise a control circuitry 1202, e.g. a chip, a processor, a micro controller, or a combination of such circuitries causing the apparatus to perform any of the embodiments of the invention. The control circuitry 1202 may be implemented with a separate digital signal processor provided with suitable software embedded on a computer readable medium, or with a separate logic circuit, such as an application specific integrated circuit (ASIC). The control circuitry 1202 may comprise an interface, such as computer port, for providing communication capabilities. The memory 1204 may store software (PROG) executable by the at least one control circuitry 1202.

The control circuitry 1202 may comprise a transmission power (TP) mode selection circuitry 1210 for selecting the transmission power mode according to any of the embodiments.

The control circuitry 1202 may comprise a carrier aggregation (CA) mode determination circuitry 1212 for determining the CA configuration according to any of the embodiments.

The apparatus 1200 may further comprise radio interface components (TRX) 1206 providing the apparatus with radio communication capabilities with the radio access network. The radio interface components 1206 may comprise standard well-known components such as amplifier, filter, frequency-converter, (de)modulator, and encoder/decoder circuitries and one or more antennas.

The apparatus 1200 may also comprise a user interface 1208 comprising, for example, at least one keypad, a microphone, a touch display, a display, a speaker, etc. The user interface 1208 may be used to control the apparatus 1200 by the user.

As said, the apparatus 1200 may comprise the memory 1204 connected to the control circuitry 1202. However, memory may also be integrated to the control circuitry 1202 and, thus, no memory 1204 may be required. The memory 1204 may be implemented using any suitable data storage technology, such as semiconductor based memory devices, flash memory, magnetic memory devices and systems, optical memory devices and systems, fixed memory and removable memory. The memory 1204 may be for storing data related to the transmission power modes and to the CA configurations. It may further store information related to the predetermined criteria and thresholds for switching between different modes, for example.

An embodiment, as shown in FIG. 13, provides an apparatus 1300 comprising a control circuitry (CTRL) 1302, such as at least one processor, and at least one memory 1304 including a computer program code (PROG), wherein the at least one memory 1304 and the computer program code (PROG), are configured, with the at least one control circuitry 1302, to cause the apparatus 1300 to carry out any one of the above-described processes. It should be noted that FIG. 13 shows only the elements and functional entities required for understanding a processing system of the apparatus 1300. Other components have been omitted for reasons of simplicity. It is apparent to a person skilled in the art that the apparatus may also comprise other functions and structures.

In an embodiment, the apparatus 1300 may be or be comprised in a base station (also called a base transceiver station, a Node B, a radio network controller, or an evolved Node B, for example). In an embodiment the apparatus 1300 is or is comprised in the eNB 100 of the secondary cell.

In another embodiment, the apparatus 1300 may comprise the terminal device of a cellular communication system, e.g. a computer (PC), a laptop, a tabloid computer, a cellular phone, a communicator, a smart phone, a palm computer, or any other communication apparatus. Alternatively, the apparatus 1300 is comprised in such a terminal device. Further, the apparatus 1300 may be or comprise a module (to be attached to the UE) providing connectivity, such as a plug-in unit, an "USB dongle", or any other kind of unit. The unit may be installed either inside the UE or attached to the UE with a connector or even wirelessly. In yet another embodiment, the apparatus 1300 is or is comprised in a base station of a secondary cell.

As said, the apparatus 1300 may comprise a control circuitry 1302, e.g. a chip, a processor, a micro controller, or a combination of such circuitries causing the apparatus to perform any of the embodiments of the invention. The control circuitry 1302 may be implemented with a separate digital signal processor provided with suitable software embedded on a computer readable medium, or with a separate logic circuit, such as an application specific integrated circuit (ASIC). The control circuitry 1302 may comprise an interface, such as computer port, for providing communication capabilities. The memory 1304 may store software (PROG) executable by the at least one control circuitry 1302.

The control circuitry 1302 may comprise a power control circuitry 1310 for applying the indicated transmission power mode according to any of the embodiments.

The control circuitry 1302 may comprise a carrier aggregation (CA) circuitry 1312 for performing the CA configuration according to any of the embodiments.

The apparatus 1300 may further comprise radio interface (TRX) components 1306 providing the apparatus with radio communication capabilities with the radio access network. The radio interface components 1306 may comprise standard well-known components such as amplifier, filter, frequency-converter, (de)modulator, and encoder/decoder circuitries and one or more antennas.

The apparatus 1300 may also comprise a user interface 1308 comprising, for example, at least one keypad, a microphone, a touch display, a display, a speaker, etc. The user interface 1308 may be used to control the apparatus 1300 by the user.

As said, the apparatus 1300 may comprise the memory 1304 connected to the control circuitry 1302. However, memory may also be integrated to the control circuitry 1302 and, thus, no memory 1304 may be required. The memory 1304 may be implemented using any suitable data storage technology, such as semiconductor based memory devices, flash memory, magnetic memory devices and systems, optical memory devices and systems, fixed memory and removable memory. The memory 1304 may be for storing data related to the transmission power modes and to the CA configurations. It may further store information related to the predetermined criteria and thresholds for switching between different modes, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 12. In an embodiment, the control circuitry 1202, such as at least one processor, the memory 1204, and the computer program code (PROG) form an embodiment of processing means for carrying out the embodiments of the invention. In another embodiment, the control circuitry 1302, such as at least one processor, the memory 1304, and the computer program code (PROG) form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for efficient carrier aggregation comprising:
   circuitry configured to
      identify a primary component carrier corresponding to a primary communication system and at least one secondary component carrier corresponding to at least one secondary communication system;
      acquire carrier sensing information corresponding to the at least one secondary component carrier based on component carrier sensing performed on the at least one secondary component carrier, the carrier sensing information indicating a traffic load on the at least one secondary component carrier;
      identify a carrier aggregation configuration to be implemented based on the identified primary component carrier and the at least one secondary component carrier, and the carrier sensing information; and apply the determined carrier aggregation configuration in communication performed on the carrier aggregation configuration.

2. The apparatus of claim 1, wherein the circuitry is configured to acquire a timing of when to apply the determining carrier aggregation configuration.

3. The apparatus of claim 2, wherein the circuitry is configured to start applying the determining carrier aggregation configuration in accordance with the timing.

4. The apparatus of claim 1, wherein the carrier sensing information indicates an amount of interference on the at least one secondary component carrier.

5. The apparatus of claim 1, wherein the primary communication system is a Long Term Evolution (LTE) system.

6. The apparatus of claim 1, wherein the secondary communication system is a WiFi system.

7. The apparatus of claim 1, wherein the primary component carrier is mapped to a gap between two non-overlapping signals on a band shared by the primary and secondary communication systems.

8. The apparatus of claim 7, wherein the at least one secondary component carrier comprises carrier segments adjacent to the primary component carrier and is mapped within the two non-overlapping signals on the band shared by the primary and secondary communication systems.

9. The apparatus of claim 1, wherein
the apparatus is a mobile terminal, and
the circuitry is configured to
receive a notification to perform the component carrier sensing from a base station via the primary communication system;
perform the component carrier sensing on the at least one secondary component carrier;
transmit a result of the component carrier sensing to the base station; and
identify the carrier aggregation configuration to be implemented based on information identifying the carrier aggregation configuration to be implemented received from the base station.

10. The apparatus of claim 9, wherein the circuitry is configured to transmit the carrier sensing information to the base station via the primary communication system.

11. The apparatus of claim 1, wherein
the apparatus is a base station, and
the circuitry is configured to
transmit an indication to perform the component carrier sensing on the at least one secondary component carrier to a mobile terminal;
acquire the carrier sensing information corresponding to the at least one secondary component carrier from the mobile terminal;
determine the carrier aggregation configuration to be implemented based on the identified primary component carrier and the at least one secondary component carrier, and the carrier sensing information; and transmit a notification to the mobile terminal identifying the determined carrier aggregation configuration.

12. The apparatus of claim 1, wherein the primary communication system is a Long Term Evolution (LTE) system.

13. The apparatus of claim 1, wherein the secondary communication system is a WiFi system.

14. The apparatus of claim 1, wherein
the licensed frequency band corresponds to a frequency band in which a Long Term Evolution (LTE) system operates. and
the unlicensed frequency band corresponds to a frequency band in which a WiFi system operates.

15. An apparatus for efficient carrier aggregation, comprising:
circuitry configured to
acquire carrier sensing information corresponding to at least one secondary component carrier corresponding to at least one secondary communication system based on component carrier sensing performed on the at least one secondary component carrier, the carrier sensing information indicating a traffic load on the at least one secondary component carrier;
identify a carrier aggregation configuration to be implemented based on a primary component carrier corresponding to a primary communication system, the at least one secondary component carrier, and the carrier sensing information; and
apply the determined carrier aggregation configuration in communication performed on the carrier aggregation configuration.

16. The apparatus of claim 15, wherein the circuitry is configured to determine a timing of when to apply the determining carrier aggregation configuration.

17. The apparatus of claim 15, wherein the carrier sensing information corresponds to an amount of interference on the at least one secondary component carrier.

18. An apparatus for efficient carrier aggregation, comprising:
circuitry configured to
acquire carrier sensing information corresponding to at least a first component carrier in an unlicensed frequency band based on component carrier sensing performed on the at least first component carrier, the carrier sensing information indicating a traffic load on the at least one secondary component carrier;
identify a carrier aggregation configuration to be implemented based on a second component carrier in a licensed frequency band, the at least one first component carrier, and the carrier sensing information; and
apply the determined carrier aggregation configuration in communication performed on the carrier aggregation configuration.

* * * * *